US012799426B2

(12) United States Patent
Carte

(10) Patent No.: US 12,799,426 B2
(45) Date of Patent: Nov. 17, 2026

(54) CANDLE VESSEL WITH REMOVABLE BASE

(71) Applicant: Megan Carte, Vienna, VA (US)

(72) Inventor: Megan Carte, Vienna, VA (US)

( * ) Notice: Subject to any disclaimer, the term of this patent is extended or adjusted under 35 U.S.C. 154(b) by 0 days.

(21) Appl. No.: 19/077,049

(22) Filed: Mar. 11, 2025

(65) Prior Publication Data

US 2026/0028550 A1 Jan. 29, 2026

Related U.S. Application Data

(60) Provisional application No. 63/675,253, filed on Jul. 24, 2024.

(51) Int. Cl.
*C11C 5/00* (2006.01)

(52) U.S. Cl.
CPC .................................... *C11C 5/008* (2013.01)

(58) Field of Classification Search
CPC ....................................................... C11C 5/008
See application file for complete search history.

(56) References Cited

U.S. PATENT DOCUMENTS

| | | | | | |
|---|---|---|---|---|---|
| 585,026 | A * | 6/1897 | Delery | H01B 17/22 174/164 |
| 2,019,402 | A * | 10/1935 | Duffy | B65D 41/0414 215/354 |
| 3,724,982 | A * | 4/1973 | Davis | C11C 5/023 425/117 |
| 2002/0048739 | A1 * | 4/2002 | Chu | F23D 3/16 431/291 |
| 2003/0101639 | A1 * | 6/2003 | Schinski | C11C 5/008 44/275 |
| 2016/0334096 | A1 * | 11/2016 | Von Zell | F21V 21/14 |
| 2024/0255138 | A1 * | 8/2024 | Cote | F23D 3/16 |

FOREIGN PATENT DOCUMENTS

| | | | |
|---|---|---|---|
| CN | 204554749 U | * | 8/2015 |
| CN | 221366404 U | * | 7/2024 |
| WO | WO-2021011812 A1 | * | 1/2021 |

* cited by examiner

*Primary Examiner* — Michael G Hoang
*Assistant Examiner* — Logan P Jones
(74) *Attorney, Agent, or Firm* — Diana Mederos; Mederos Legal, PLLC

(57) ABSTRACT

A vessel complex is made by concentrically threading a vessel to a base and is for use with candles and other media suitable for visual aesthetics or fragrance release. The separate vessel and a separate base are removably connected for efficient cleaning, re-using, recycling, decanting, and filling. The base is double walled with threaded sides that concentrically accept a threaded screw end of a vessel, prevent escape of fuel source filled in the vessel complex interior space.

14 Claims, 18 Drawing Sheets

CANDLE VESSEL WITH REMOVABLE BASE

CROSS REFERENCE TO RELATED APPLICATION

This application claims priority to U.S. provisional patent application No. 63/657,253 entitled Candle Vessel with Removable Base, having a filing date of Jul. 24, 2024, the entire contents of which are incorporated by reference herein.

FIELD OF THE DISCLOSURE

The present disclosure relates to a two-piece vessel complex having a removably attached vessel and base. The vessel complex is likely to be used as a candle vessel but can accommodate any suitable fuel source. The vessel complex is re-usable and interchangeable.

BACKGROUND OF THE DISCLOSURE

Candles are popular purchases and serve to enhance the décor and mood of a space and may also serve to promote relaxation and enhance meditation. Candles are available in a variety of colors, textures, shapes, and fragrances. Candles may be positioned without a vessel or inside a vessel. However, there is a lack of interchangeability and inefficiencies with standard candle vessels.

When a candle is nearly fully consumed, the remaining wax or other fuel source material is left inside the vessel, and the vessel is discarded. Sometimes, the vessel can be recycled or re-used. In such cases, the vessel is heated in a water bath, and the remaining wax is liquified and removed. This is often a messy practice, and wax can clog sink drains if someone decants the liquified wax down a drain.

Another problem with traditional candles is wick safety due to limited access to the base of traditional vessels. This makes securely fixing the wick to the base problematic and repositioning the wick if necessary difficult. Wicks should be hot glued to a vessel base, but reaching the bottom of the base is not always possible due to the size and shape of the vessel.

One of the inconveniences of candle making is the candle fuel source such as wax resulting in defects such as bubbles, frosting, wet spots, discoloration that is visible from a transparent or translucent vessel. The candlemaker can not fix defects that appear on the sides of the fuel source such as a hard wax candle because there is no way to access the hard wax candle once it is in the vessel without destroying the candle or having to melt the wax fuel source and start over.

SUMMARY OF THE DISCLOSURE

What is needed is a vessel complex with a removably attached vessel and base that contains a fuel source within a vessel void without leakage to an exterior surface of the vessel complex. The vessel complex void can be filled with a fuel source such as wax. Once the wax hardens, the vessel complex can be disassembled to remove the vessel while leaving the fuel source and base intact.

A preferred embodiment of the disclosure has a vessel with a male threaded portion, vessel transition ledge, a bottom screw edge, an interior wall defining an interior void, an exterior surface, a top open end, and a top edge.

A preferred embodiment of the disclosure has a base with a female threaded portion, an exterior wall, an exterior wall edge, an interior wall, an interior wall edge, an exterior wall thread, an interior wall thread, an interior bottom surface, an interior wall, an exterior wall, and an exterior bottom surface.

In one embodiment, the vessel and the base are double walled with an insulation space. However, it is also considered that the vessel and the base are solid without an insulation space.

In an alternative embodiment, the base is made of a conducive material, compatible with external heat source surfaces.

The vessel complex is used by concentrically threading the vessel and the base, filling the vessel complex interior void with a fuel source, heating the fuel source, removing the base from the vessel, removing fuel source reside from the base and the vessel interior walls, and re-attaching the base and the vessel.

BRIEF DESCRIPTION OF THE DRAWINGS

The accompanying drawings that are incorporated in and constitute a part of this specification illustrate several embodiments of the disclosure. Together with the description, they serve to explain the principles of the disclosure.

NUMERALS OF THE FIGURES

Figure 1:
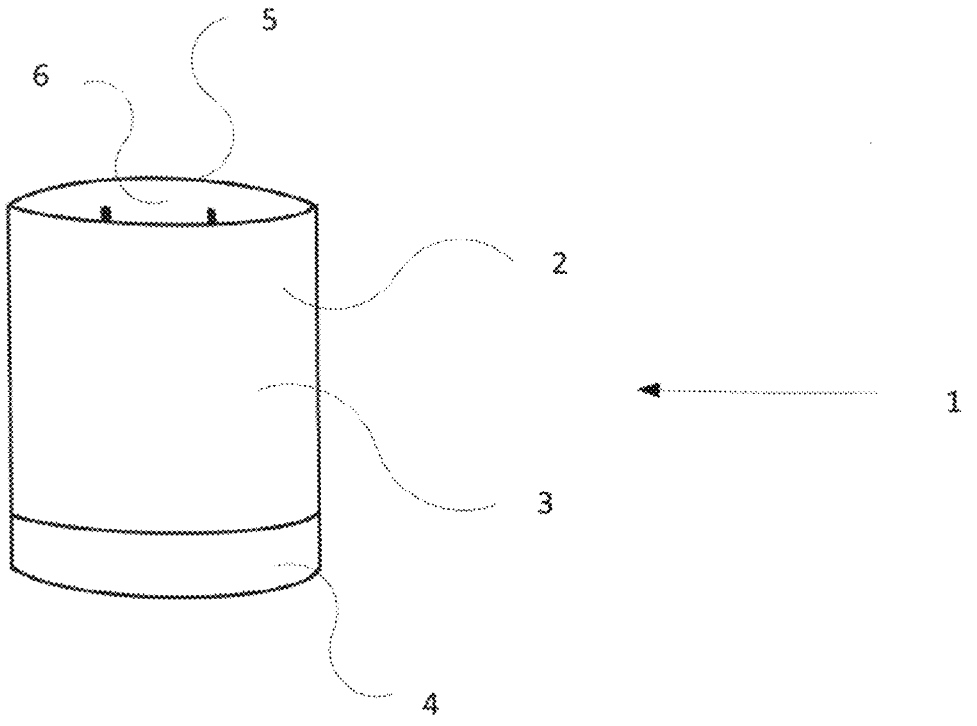
FIG. 1 illustrates a frontal view of an exemplary vessel complex.

1. Vessel complex
2. Vessel

3. Vessel exterior surface
4. Base
5. Vessel rim
6. Vessel interior surface
7. Vessel interior space
8. Vessel insulating space
9. Vessel interior void
10. Base void
11. Vessel exterior wall
12. Vessel interior wall
13. Vessel transition ledge
14. Vessel male threaded portion
15. Fuel source
16. Gasket
17. Vessel first insulating wall
18. Vessel second insulating wall
19. Base insulating space
20. Base interior void
21. Base first insulating wall of female thread
22. Base exterior wall
23. Base second insulating wall of female thread
24. Base interior wall
25. Heat source surface
26. Wick end
27. Wick
28. Bottom screw edge
29. Vessel top open end
30. Vessel top edge
31. Base threaded portion
32. Base exterior wall edge
33. Base interior wall edge
34. Base exterior wall thread
35. Base interior wall thread
36. Base interior bottom surface
37. Base exterior bottom surface
38. Fuel source residue
39. Seam

DETAILED DESCRIPTION

The present disclosure provides generally for a vessel complex having a removably attached vessel and coordinating base and variations thereof. The ways of using the exemplary vessel complex are explained.

In the following sections, detailed descriptions of examples and methods of the disclosure will be given. The description of both preferred and alternative examples are exemplary only, and it is understood that to those skilled in the art that variations, modifications, and alterations may be apparent. It is therefore to be understood that the examples do not limit the broadness of the aspects of the underlying disclosure as defined by the claims.

DETAILED DESCRIPTIONS OF THE DRAWINGS

Referring now to FIG. 1, a frontal view of an exemplary vessel complex is illustrated. A vessel complex comprises a vessel with a male threaded portion and a base with a female threaded portion. The base and the vessel are removably attached. The vessel and the base may be interchangeable. Various materials suitable for candles can be used for the vessel and base construction such as glass and tin.

Figure 2:
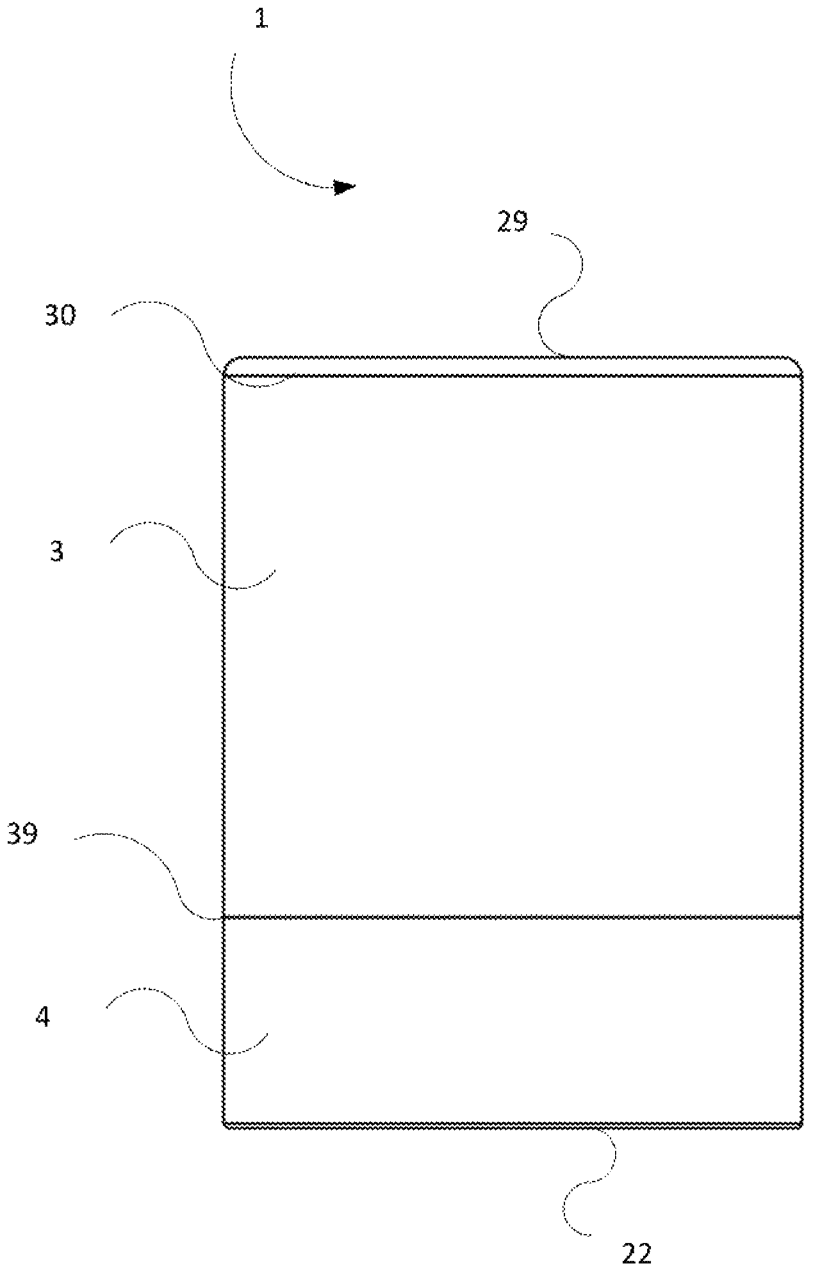
FIG. 2 illustrates a front view of an exemplary vessel complex in an assembled configuration and without leakage of fuel source.

Referring now to FIG. 2, a front view of an exemplary vessel complex in an assembled configuration and without leakage of fuel source is shown.

Figure 3:
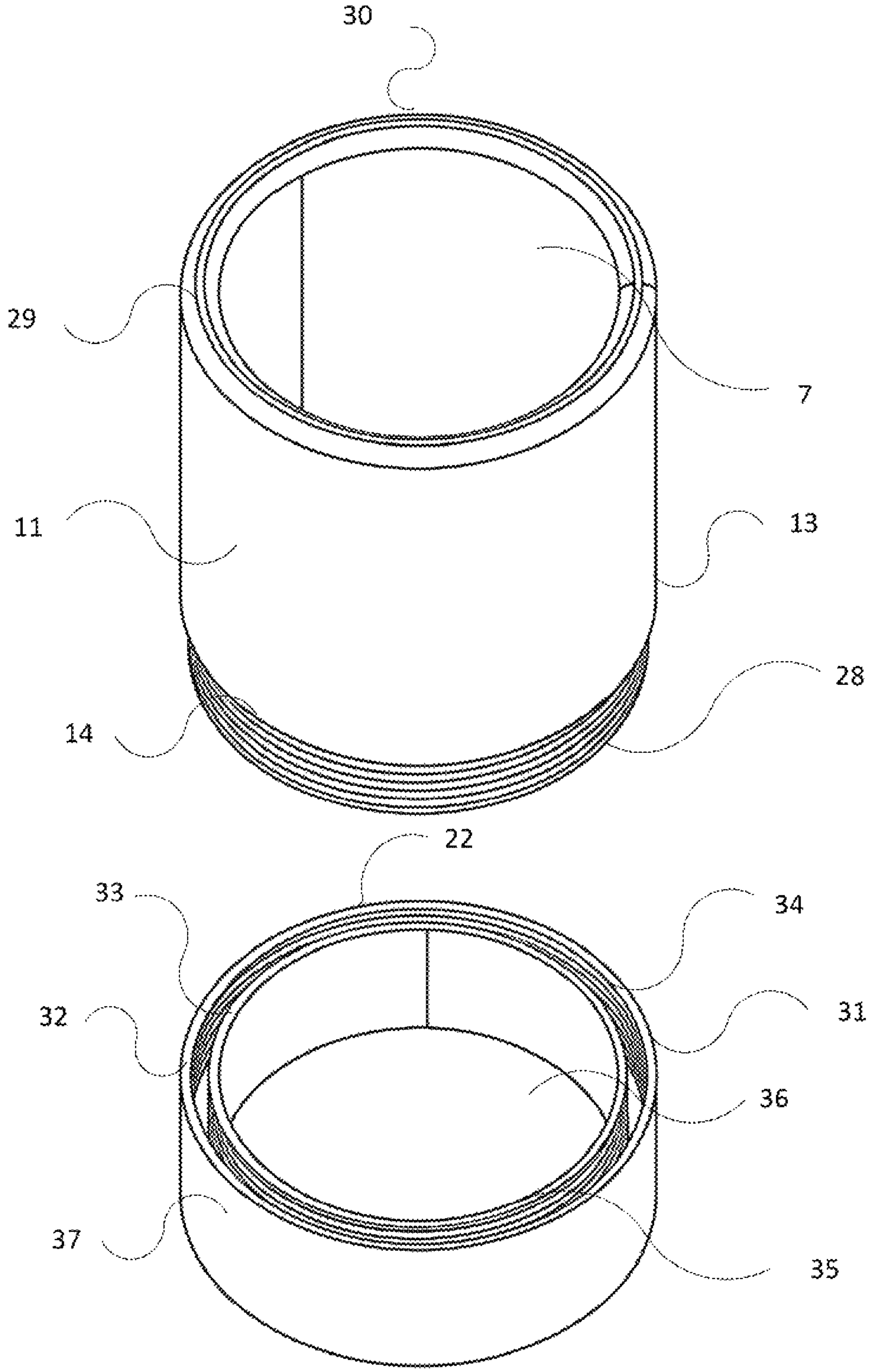
FIG. 3 illustrates an exploded view of an exemplary vessel complex.
Figure 4:
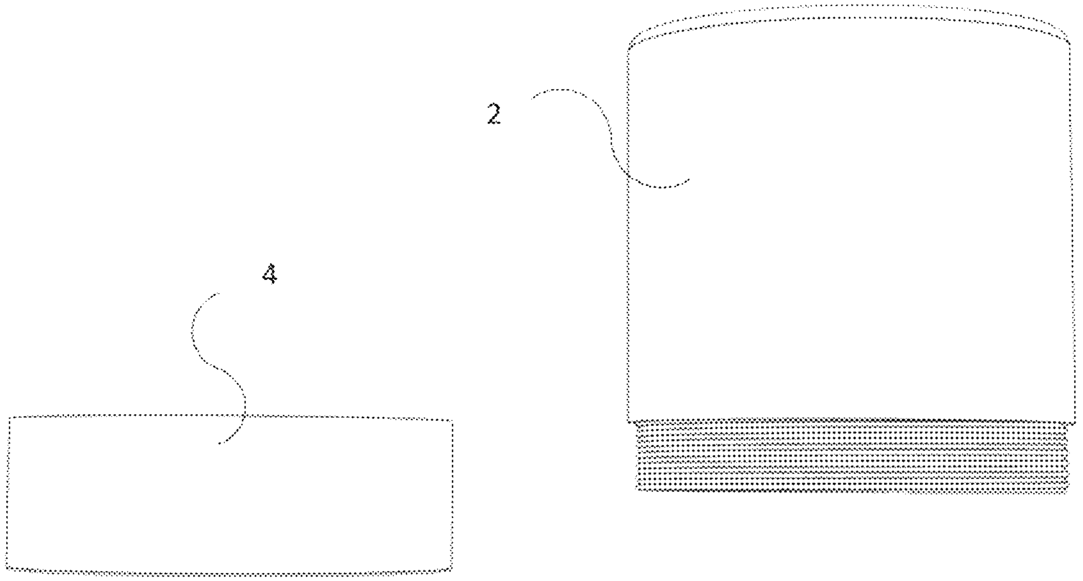
FIG. 4 illustrates a front view of an exemplary base and an exemplary vessel in a disassembled configuration.

Referring now to FIG. 3, an exploded view of an exemplary vessel complex is shown. The vessel is concentrically threaded by its male threaded portion into a female threaded portion of the base to form the assembled configuration as shown in FIG. 2. The vessel male threaded portion is surrounded by the walls of the female base threaded portion. When fuel source is filled into the vessel complex interior void, the fuel source will not come in contact with the threaded portions. Accordingly, disassembly of the vessel complex will still be possible while the fuel source has filled the interior void. The interior void may be partially or fully filled with a fuel source such as a wax, gel, liquid gas, or liquid.

Figure 5:
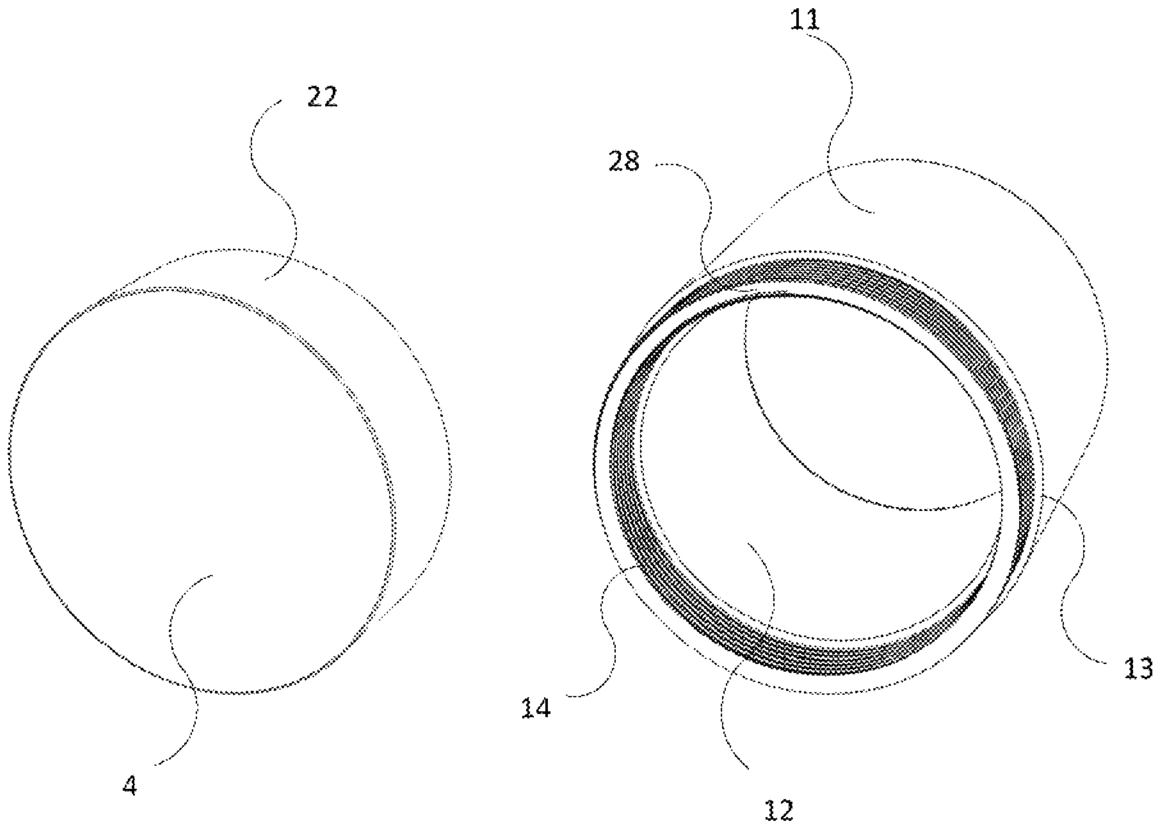
FIG. 5 illustrates a bottom perspective view of an exemplary base and an exemplary vessel in a disassembled configuration.
Figure 6:
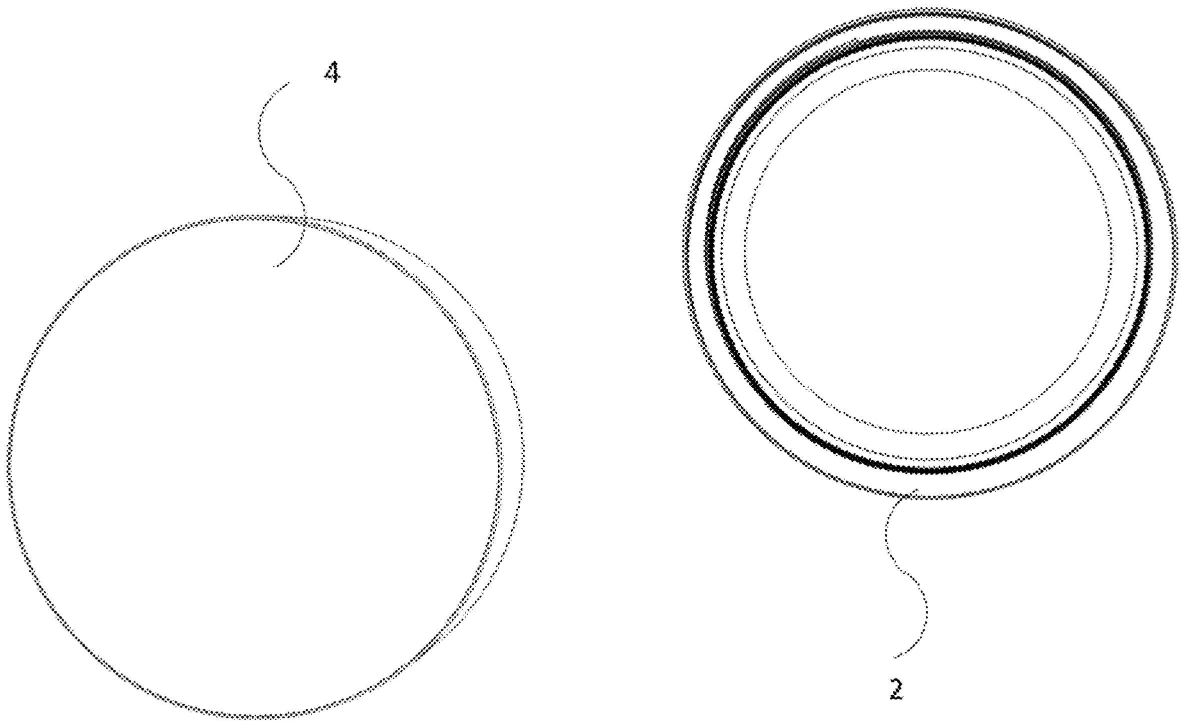
FIG. 6 illustrates a bottom frontal view of an exemplary base and an exemplary vessel in a disassembled configuration.
Figure 7:
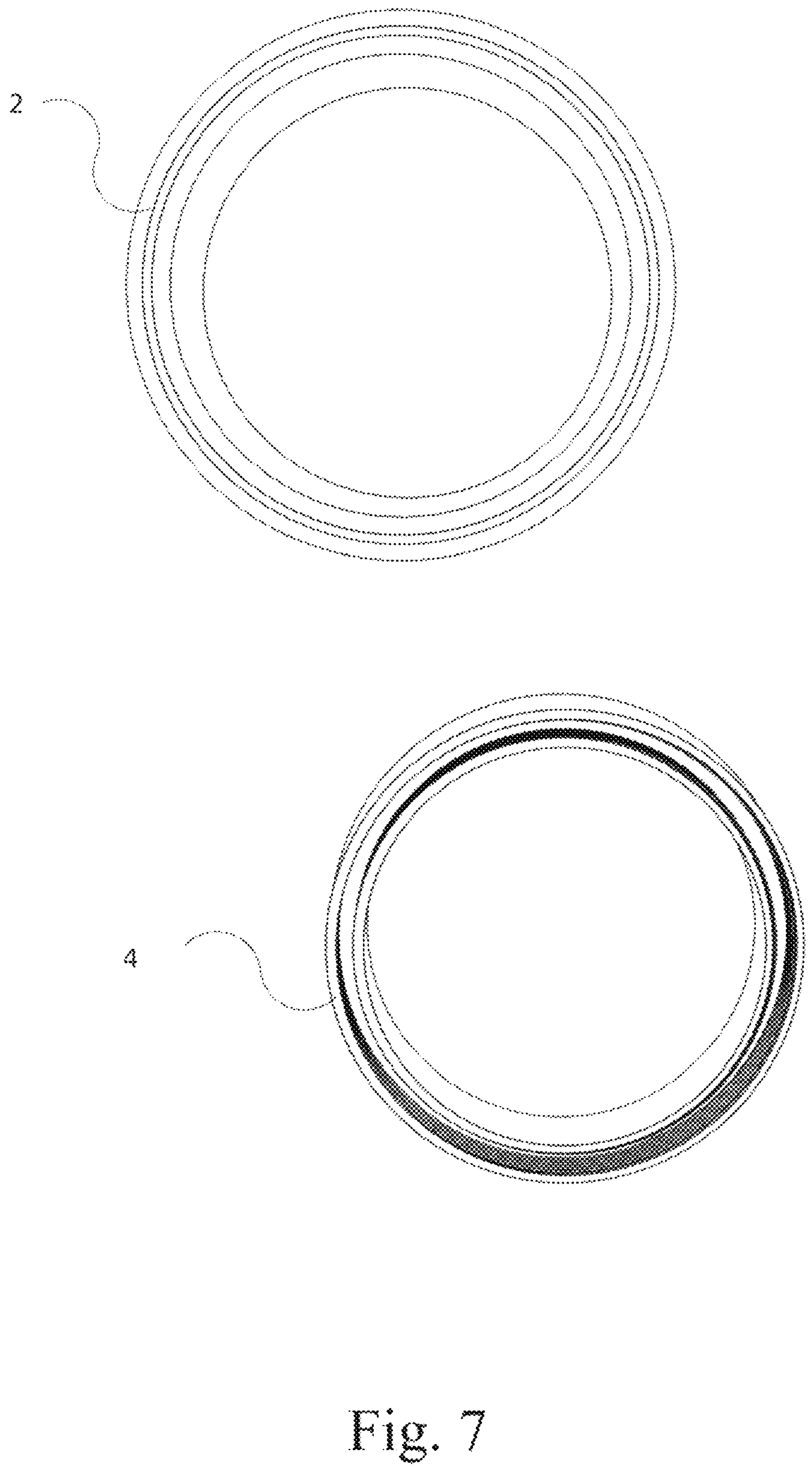
FIG. 7 illustrates a top frontal view of an exemplary base and an exemplary vessel in a disassembled configuration

Referring now to FIG. 5, a bottom perspective view of an exemplary base and an exemplary vessel in a disassembled configuration is shown. The interior surface and threaded portion of the vessel are apparent.

Referring now to FIGS. 4, 6, 7, and 11, the front, the bottom and top frontal views, and side view of an exemplary vessel complex in a disassembled configuration are shown, respectively. These views serve to fully show preferred embodiments of the disclosure.

Figure 8:
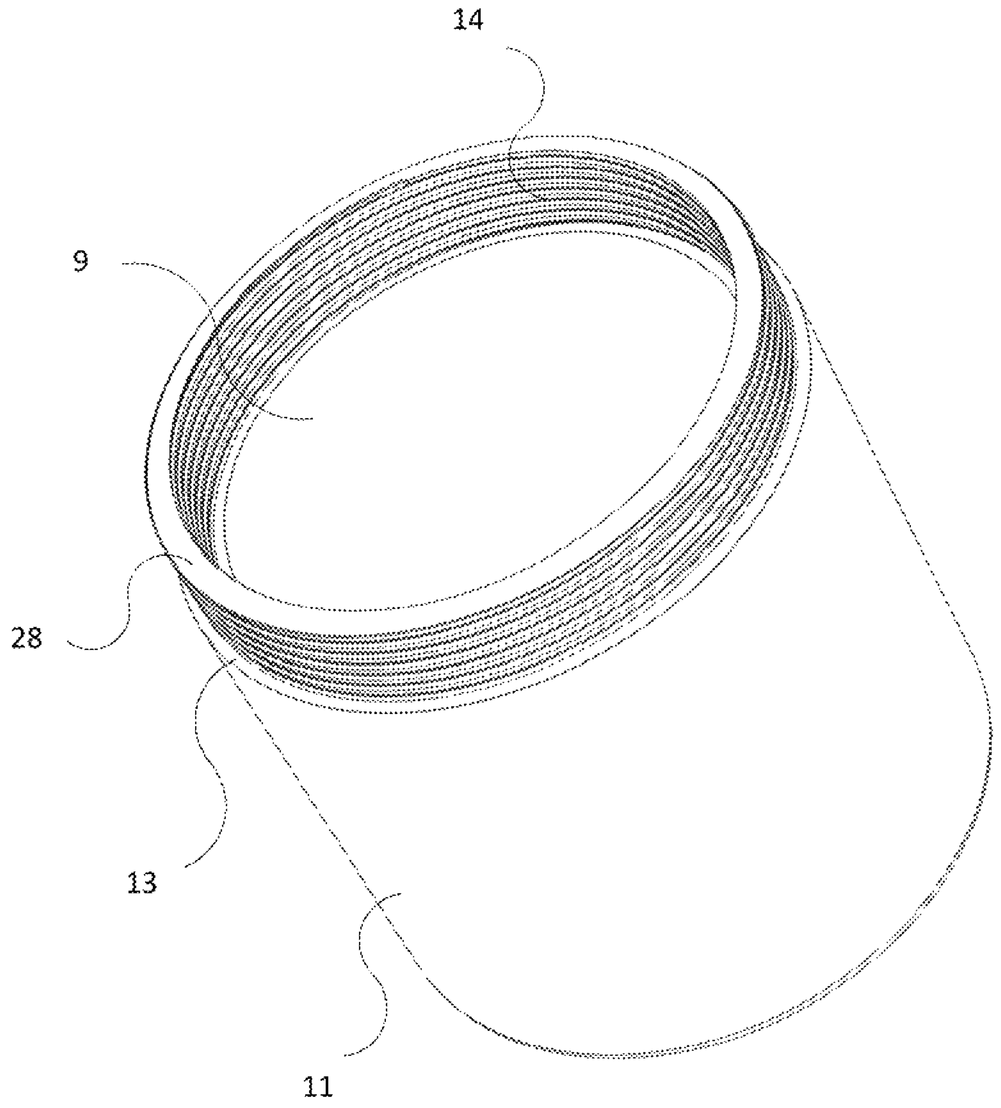
FIG. 8 illustrates an upside-down bottom perspective view of an exemplary vessel.

Referring now to FIG. 8, an upside-down bottom perspective view of an exemplary vessel is shown. In this figure, the vessel with a male threaded portion is apparent. A vessel transition ledge, a bottom screw edge, an interior wall defining an interior void, and an exterior surface are shown.

Figure 9:
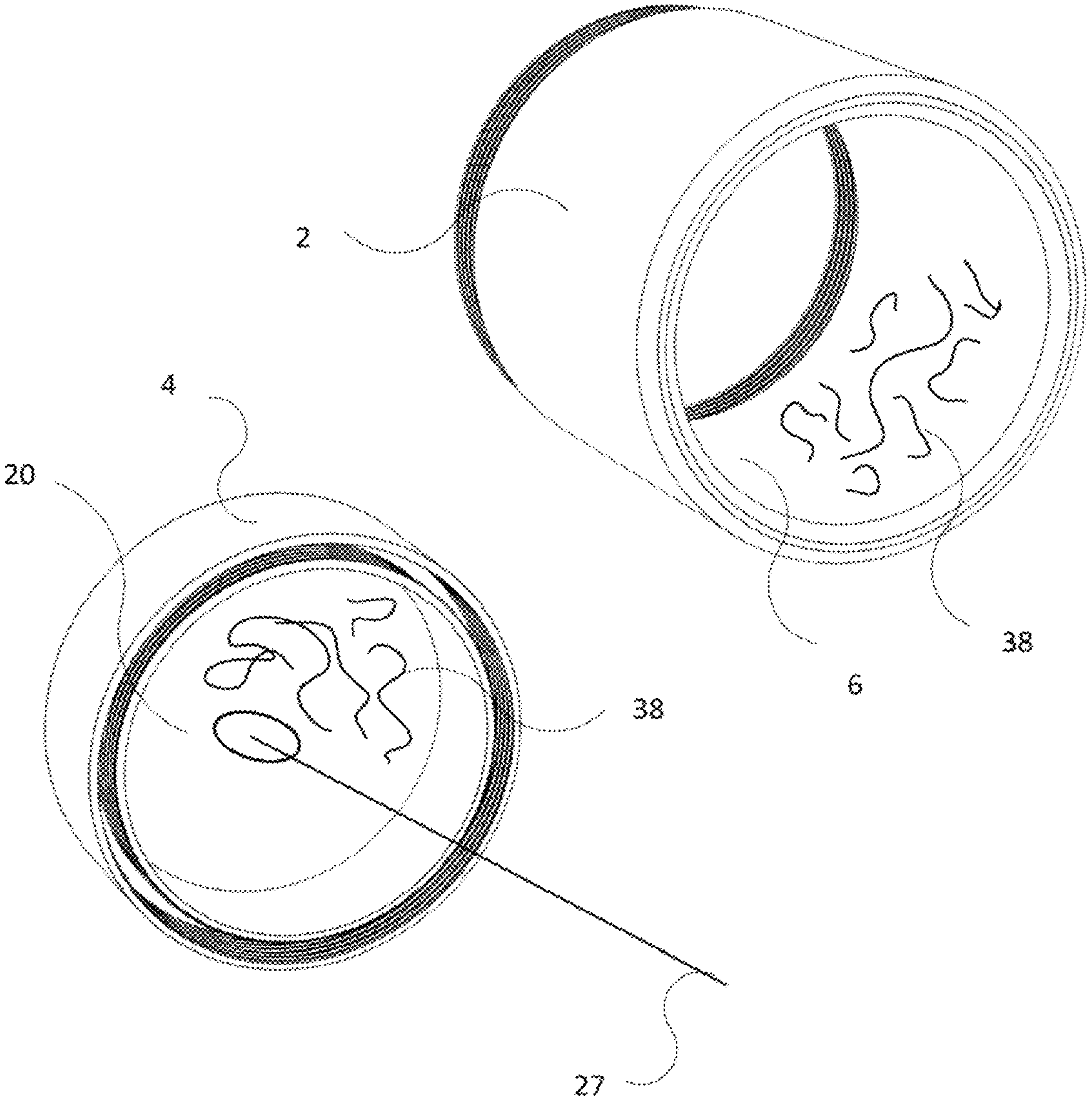
FIG. 9 illustrates a top frontal perspective view of an exemplary base and an exemplary vessel in a disassembled configuration and with a wick and fuel source residue.

Referring now to FIG. 9, a top frontal perspective view of an exemplary base and an exemplary vessel in a disassembled configuration and with a wick and fuel source residue is shown. This figure demonstrates that wicks can be accessed at the vessel bottom more directly for placement, adjustment, or removal. When the vessel is to be recycled, residue is accessible at the interior walls of the vessel and of the base. The threaded portions of the vessel and of the base do not contain residue. A notable advantage of the disclosure is the concentric configuration of the base female threaded portion and the vessel male threaded portion and their respective edges and vessel transition ledge that contact to form a seam.

Figure 10:
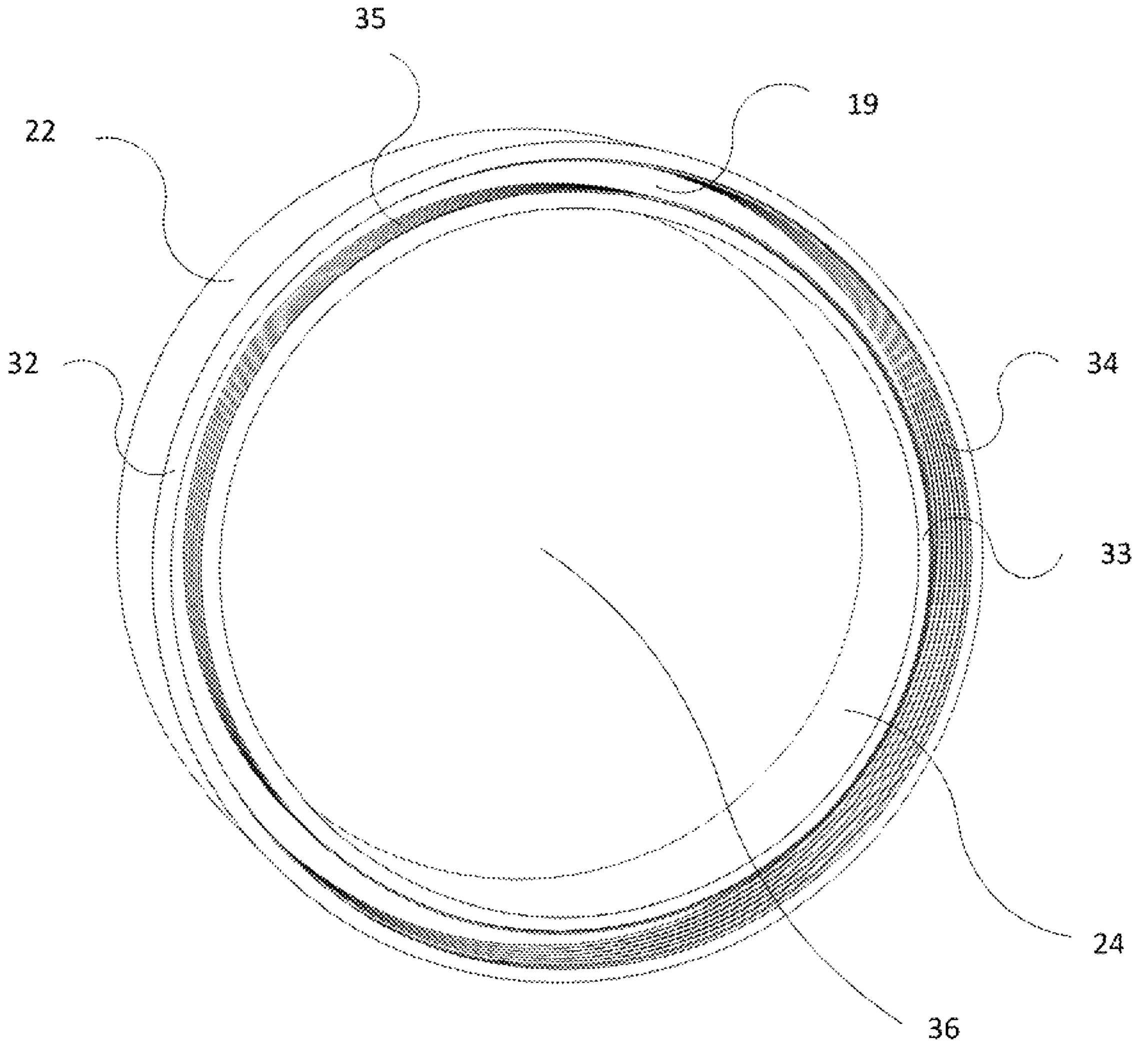
FIG. 10 illustrates a top frontal perspective view of an exemplary base.
Figure 11:
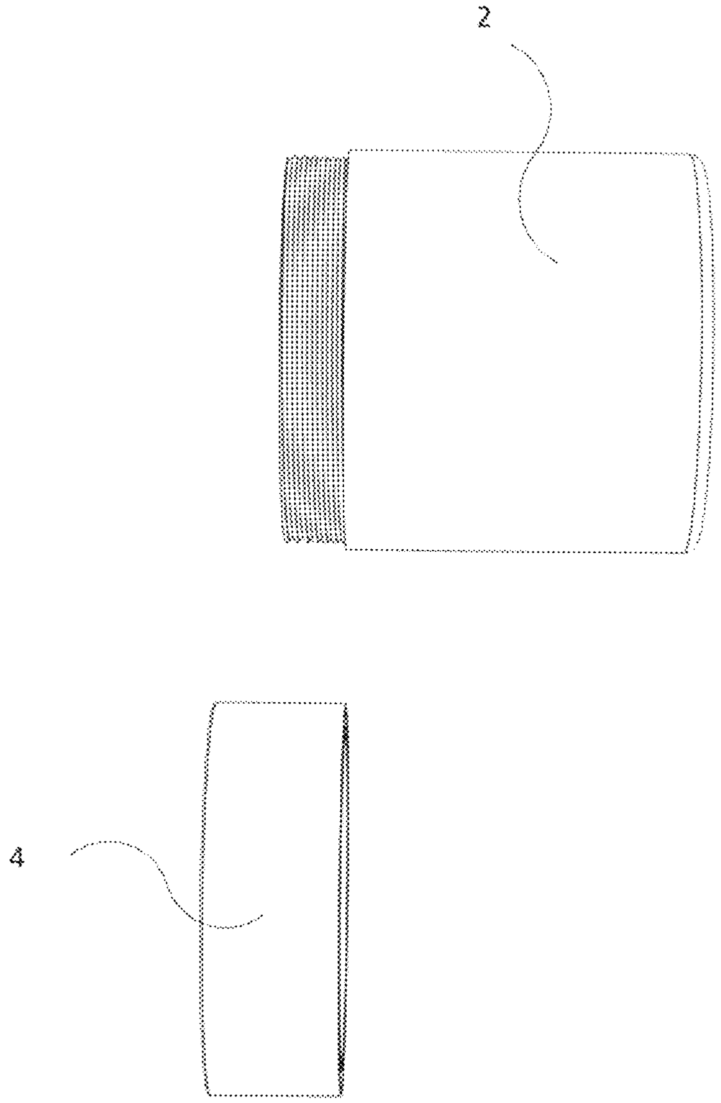
FIG. 11 illustrates a side view of an exemplary base and an exemplary vessel in a disassembled configuration.

Referring now to FIG. 10, a top frontal perspective view of an exemplary base is shown. The base parts are more apparent in this figure. The base overall has a female threaded portion. The female threaded portion is defined by an exterior wall, an exterior wall edge, an interior wall, an interior wall edge, an exterior wall thread, and interior wall thread. The base has an interior bottom surface and an interior wall, defining the interior void of the vessel complex. The base further has an exterior wall and an exterior bottom surface to house the base components.

Figure 12:
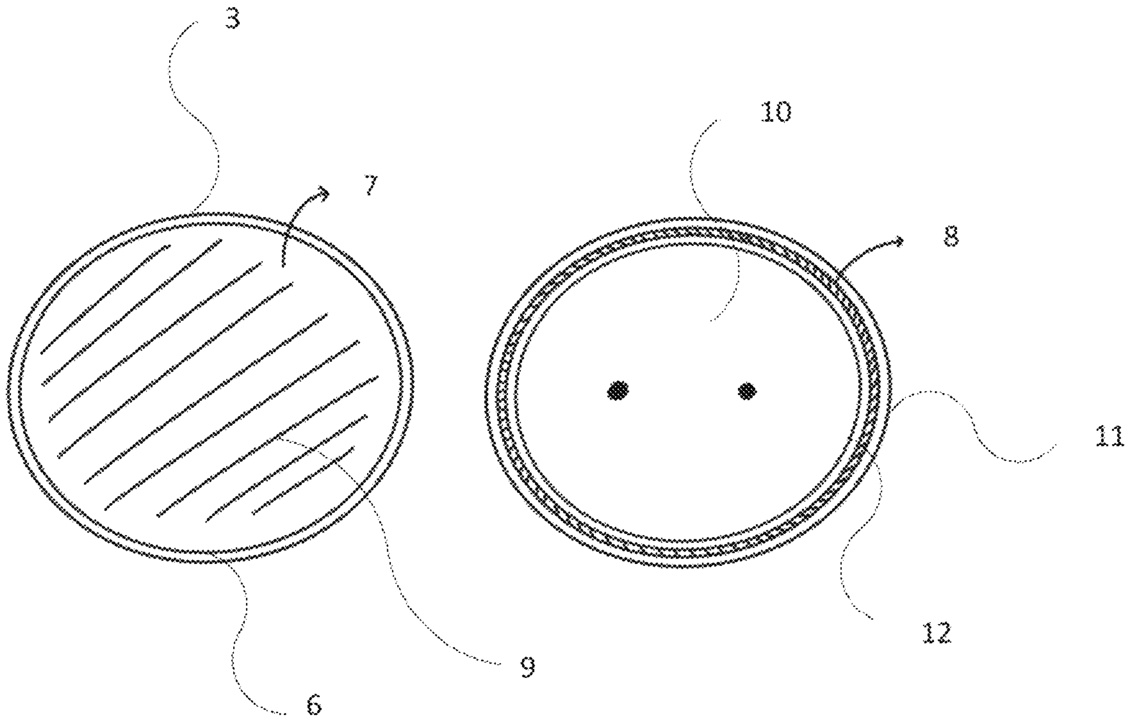
FIG. 12 illustrates a top view of a detached vessel and a detached base.

Referring now to FIG. 12, a top view of a detached vessel and a detached base is illustrated. The base has a void that is capable of receiving and retaining a fuel source. The base has a female threaded portion and a double-walled construction in preferred embodiments.

Figure 13:
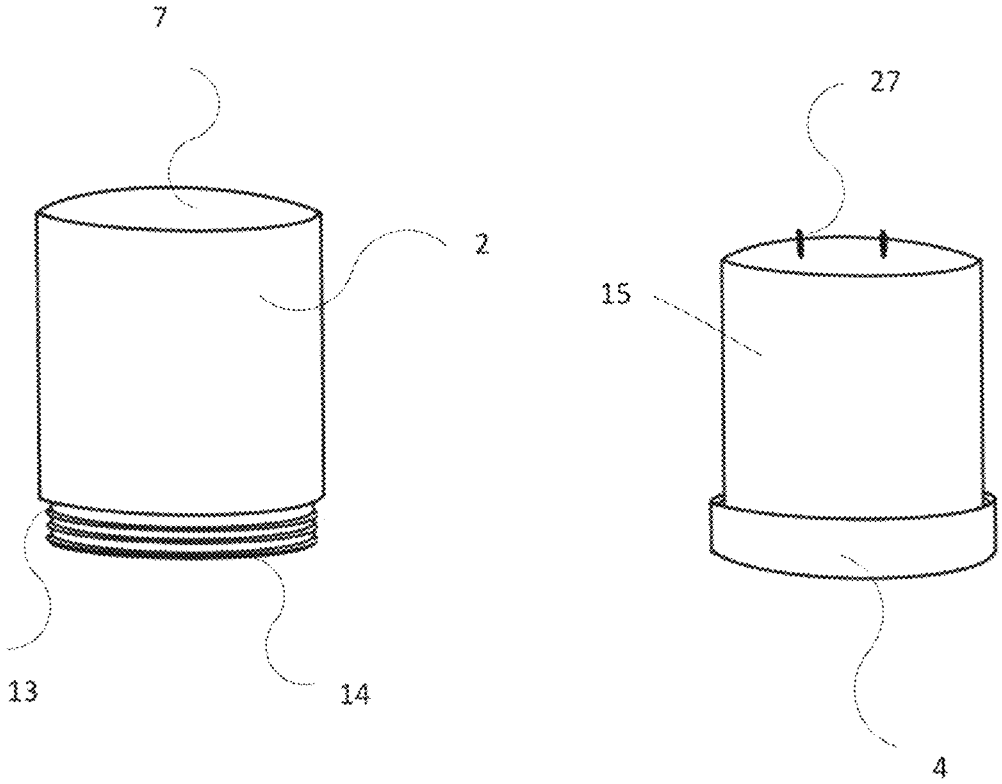
FIG. 13 illustrates a frontal view of a detached vessel and base with fuel source.

Referring now to FIG. 13, a frontal view of a detached vessel and base with fuel source is illustrated. In this example, a vessel is shown independently and subsequently shown connected to a base to form a vessel complex. A fuel source may partially or fully fill a vessel void or a base void, or both. A fuel source may be wax, gel, oil, or other suitable material.

Figure 14:
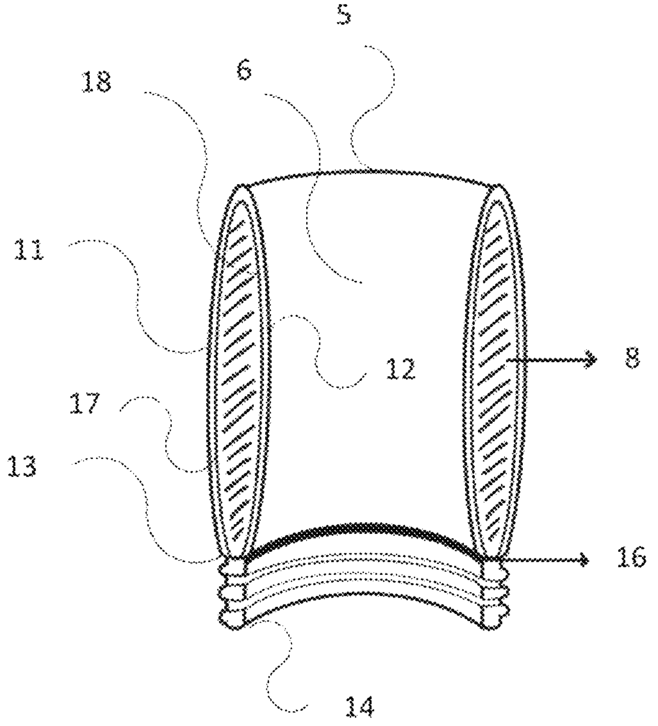
FIG. 14 illustrates a longitudinal sectional view of a vessel with gasket.

Referring now to FIG. 14, a longitudinal sectional view of a vessel with gasket is illustrated. The vessel shows an insulated multi-wall construction. The male threaded portion is configured to fit into the base's female threaded portion.

The gasket helps prevent leaks of the fuel source from the vessel interior and base interior. The insulated construction prevents burns when a person grabs the vessel complex.

Figure 15:
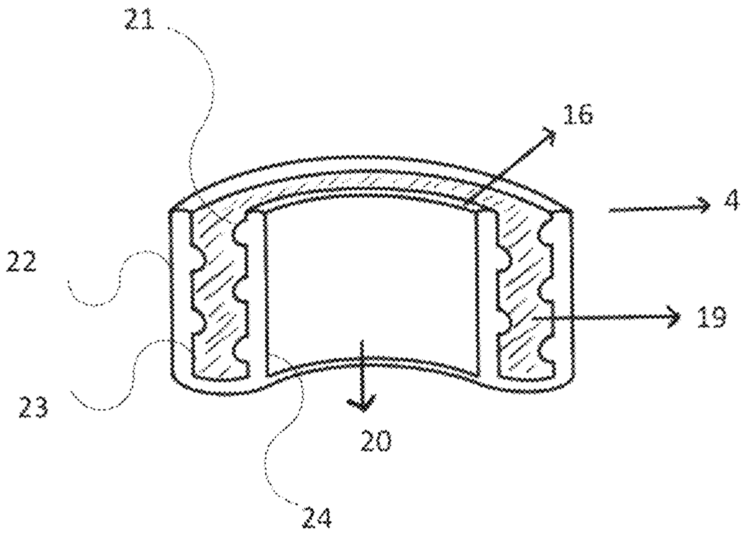
FIG. 15 illustrates a longitudinal sectional view of a base with a gasket.

Referring now to FIG. 15, a longitudinal sectional view of a base with a gasket is illustrated. The base shows an insulated multi-wall construction. The female threaded portion helps to minimize gaps between the vessel and the base with connected, so fuel source material will not leak.

Figure 16:
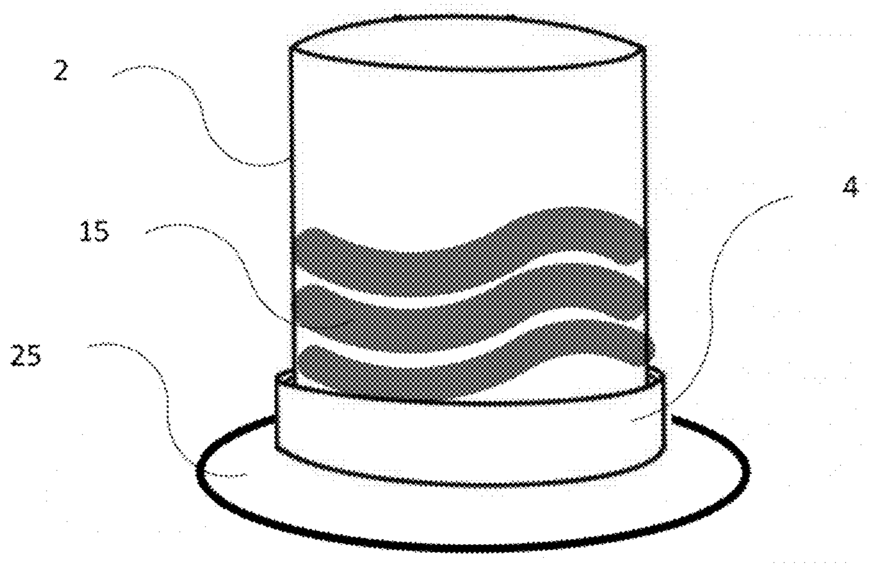
FIG. 16 illustrates a frontal view of an exemplary vessel complex placed on a heat-source surface.

Referring now to FIG. 16, a frontal view of an exemplary vessel complex placed on a heat-source surface is illustrated. In some embodiments, a wick does not have to be lighted or otherwise activated to induce consumption of a fuel source such as wax. Instead, the vessel may be placed on a heat-source surface. The base may be constructed from a ferromagnetic material for induction heating.

Figure 17:
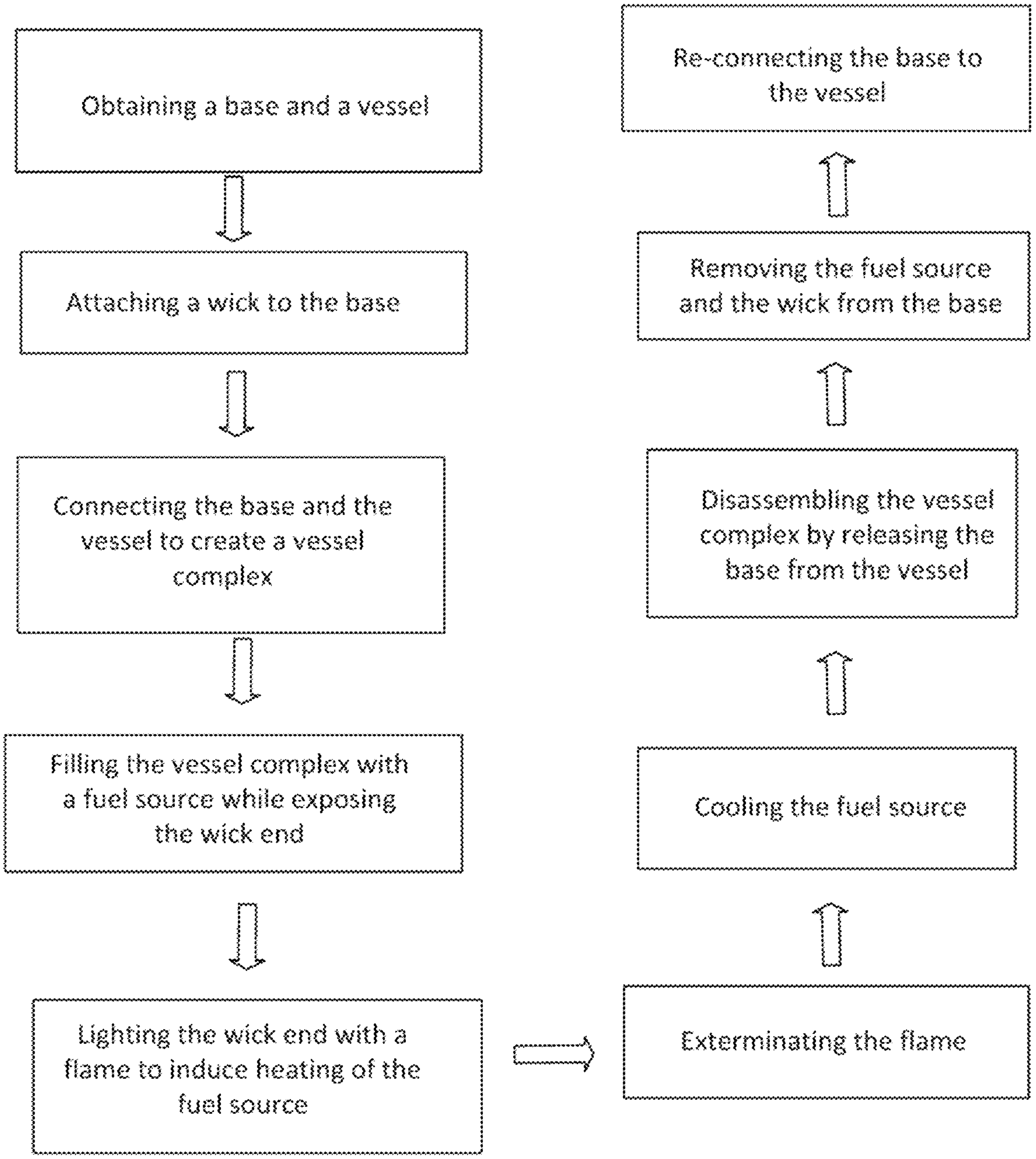
FIG. 17 illustrates exemplary method steps for using a vessel complex with a fuel source that is heated by burning a wick.

Referring now to FIG. 17, exemplary methods steps for using a vessel complex are illustrated. These steps are not exclusive but may describe steps commonly taken. For example, a person obtains a base and a vessel. A wick is attached to the base. The base is connected to the vessel to create a vessel complex. The wick can be lighted to induce heating of the fuel source. The flame can be exterminated. The fuel source is consumed. The remaining fuel source cools. Additional heating of the vessel is not required to remove the remaining fuel source. The fuel source and the wick are still connected to the base and can be removed from the base. In preferred embodiments, remining fuel source does not stick to the vessel interior walls. The base can be reconnected to the vessel and refilled with new wicks and new fuel source in the vessel interior void.

The vessel complex is disassembled by releasing the base from the vessel. More specifically, a preferred method is by holding the vessel complex in two hands, one hand cupping the vessel in the palm of the hand and fingers gripped around the vessel, and one hand cupping the base from the bottom. Each hand should make a twist motion in opposing directions-clockwise by the hand holding the base and counterclockwise by the hand holding the vessel. The twisting motion should be repeated to unthread the vessel from the base.

Figure 18:
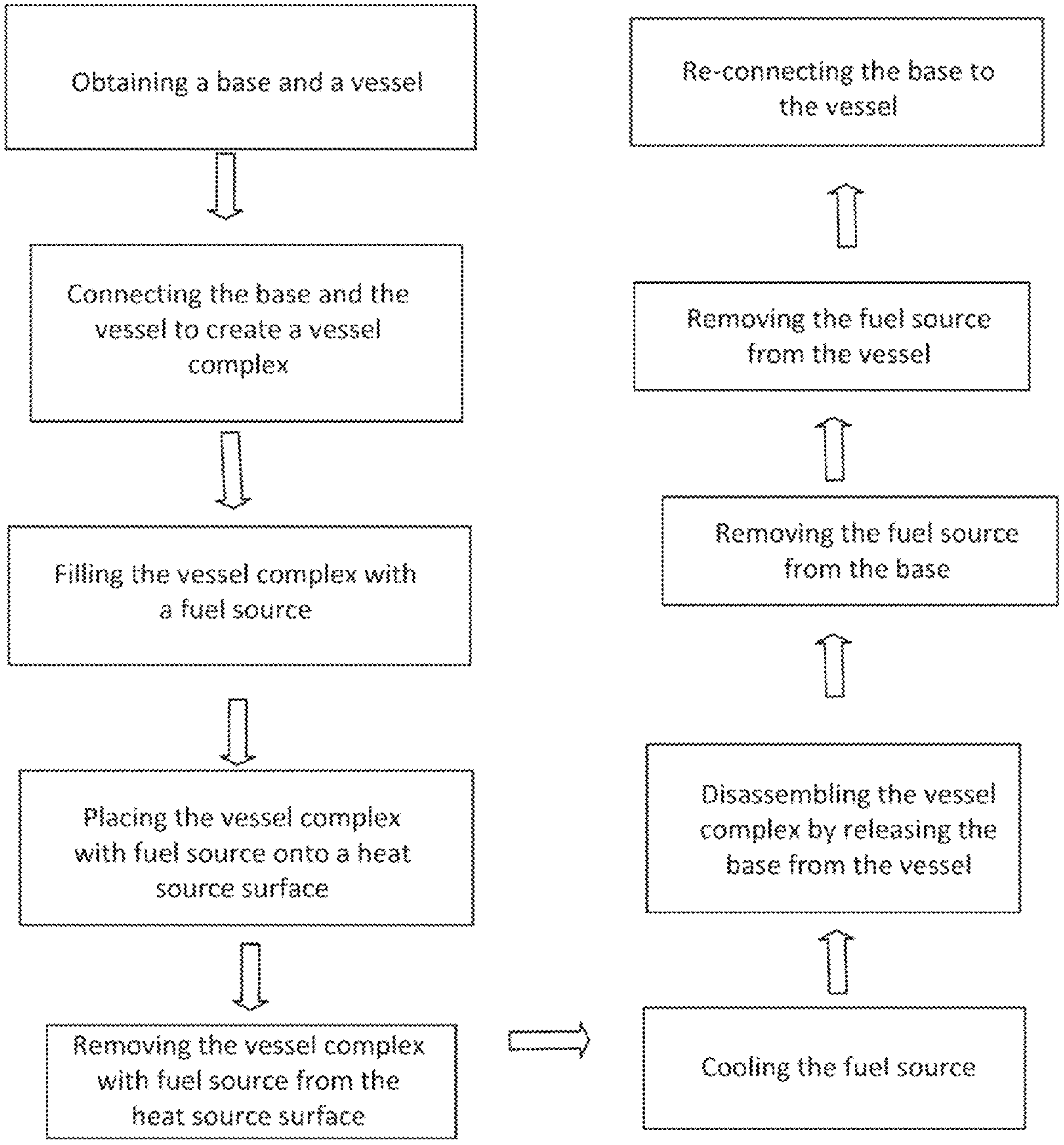
FIG. 18 illustrates exemplary method steps for using a vessel complex with a fuel source that is heated by a heat source surface.

Referring now to FIG. 18, exemplary method steps for using a vessel complex with a fuel source that is heated by a heat source surface are shown. The steps are similar to those of FIG. 17, but the fuel source is heated by placing the vessel bottom surface on a heating surface. The base bottom exterior surface may also contain a conducive or ferromagnetic material such as iron. The fuel source may or may not have a wick. It is an important advantage that a fuel source can be heated, cooled, and re-heated multiple times in the vessel complex without compromising the ability to disassemble the base and the vessel and without leakage of the fuel source through the seam and onto the exterior surface of the vessel complex.

CONCLUSION

A number of embodiments of the present disclosure have been described. While this specification contains many specific implementation details, these details should not be construed as limitations on the scope of any disclosures or of what may be claimed.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results.

Thus, particular embodiments of the subject matter have been described. Other embodiments are within the scope of the following claims. In some cases, the actions recited in the claims can be performed in a different order and still achieve desirable results. Nevertheless, it will be understood that various modifications may be made without departing from the spirit and scope of the claimed disclosure.

What is claimed is:

1. A vessel complex, comprising:

a vessel with a male threaded portion, a vessel transition ledge, a bottom screw edge, a vessel interior wall defining a vessel interior void, a vessel exterior surface, a vessel interior surface, a vessel top open end, and a vessel top edge;

a base with a female threaded portion, a base exterior wall, a base exterior wall edge, a base interior wall, a base interior wall edge, a base exterior wall thread, a base interior wall thread, a base interior bottom surface, and a base exterior bottom surface; and a fuel source;

wherein the vessel male threaded portion is removably threaded to the base female threaded portion to be in an assembled configuration with a seam between the vessel and the base;

wherein the vessel complex is in an assembled configuration where the interior void and base are filled directly with the fuel source, wherein the fuel source fills the interior void and is in direct contact with the base interior bottom surface, the base interior wall, the vessel interior wall, and the vessel interior surface;

wherein the fuel source is contained only by vessel and base; and wherein the fuel source does not leak from the interior void, through the seam, and onto the exterior surface of the vessel complex.

2. The vessel complex of claim 1, further comprising a gasket.

3. The vessel complex of claim 1, wherein the vessel is disassembled from the base to reveal the fuel source and base, wherein the fuel source is intact.

4. The vessel complex of claim 1, wherein the fuel source further comprises a wick.

5. The vessel complex of claim 1, wherein the base exterior surface comprises a conducive or ferromagnetic material.

6. A method of using the vessel complex of claim 1, comprising:

attaching the base and the vessel, filling the interior void with a fuel source, heating the fuel source, removing the base from the vessel, and removing fuel source residue from the base.

7. The method steps of claim 6, further comprising removing fuel source residue from the vessel.

8. The method steps of claim 6, further comprising re-connecting the base and the vessel to re-assemble the vessel complex.

9. The method steps of claim 8, further comprising refilling the re-assembled vessel complex by adding a fuel source to the interior void.

10. A method of using the vessel complex of claim 1, comprising:

attaching the base and the vessel,
attaching a wick to the base,
filling the interior void with a fuel source,
heating the fuel source,
removing the base from the vessel, and
removing the wick from the base.

11. The method steps of claim 10, further comprising removing fuel source residue from the vessel.

12. The method steps of claim 9, further comprising removing fuel source residue from the base.

13. The method steps of claim 10, further comprising re-connecting the base and the vessel to re-assemble the vessel complex.

14. The method steps of claim 13, further comprising re-filling the re-assembled vessel complex by adding a fuel source to the interior void.

* * * * *